US012337302B2

(12) United States Patent
Novak et al.

(10) Patent No.: US 12,337,302 B2
(45) Date of Patent: Jun. 24, 2025

(54) NICEOX AEROGELS FOR METHANE SUPPRESSION IN THE WATER-GAS SHIFT REACTION

(71) Applicant: The Government of the United States of America, as represented by the Secretary of the Navy, Arlington, VA (US)

(72) Inventors: Travis G. Novak, Lorton, VA (US); Matthew R. Buck, Columbia, MD (US); Paul A. DeSario, Alexandria, VA (US); Debra R. Rolison, Arlington, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 18/820,823

(22) Filed: Aug. 30, 2024

(65) Prior Publication Data

US 2025/0073685 A1   Mar. 6, 2025

Related U.S. Application Data

(60) Provisional application No. 63/579,693, filed on Aug. 30, 2023.

(51) Int. Cl.
| | |
|---|---|
| *B01J 23/83* | (2006.01) |
| *B01J 35/67* | (2024.01) |
| *C01B 3/16* | (2006.01) |
| *C01G 53/70* | (2025.01) |

(52) U.S. Cl.
CPC .............. *B01J 23/83* (2013.01); *B01J 35/67* (2024.01); *C01B 3/16* (2013.01); *C01G 53/70* (2013.01); *C01B 2203/0283* (2013.01); *C01B 2203/1029* (2013.01); *C01B 2203/1058* (2013.01); *C01P 2002/72* (2013.01); *C01P 2002/82* (2013.01); *C01P 2006/17* (2013.01)

(58) Field of Classification Search
None
See application file for complete search history.

(56) References Cited

U.S. PATENT DOCUMENTS

| | | | |
|---|---|---|---|
| 6,492,014 B1 | 12/2002 | Rolison et al. | |
| 7,081,433 B2 | 7/2006 | Rolison et al. | |
| 8,435,918 B2 * | 5/2013 | Eyring | B01J 37/0234 502/319 |

(Continued)

FOREIGN PATENT DOCUMENTS

KR   101269621 B1 *   6/2013

OTHER PUBLICATIONS

KR 101269621, English Translation (Year: 2013).*

(Continued)

*Primary Examiner* — Colin W. Slifka
(74) *Attorney, Agent, or Firm* — US Naval Research Laboratory; Joseph T. Grunkemeyer

(57) ABSTRACT

An oxide-based aerogel having cerium and nickel may be used as a water-gas shift reaction catalyst without producing methane as a byproduct. It may be made by forming a gel from a cerium salt and a nickel salt solution and converting the gel to an aerogel.

11 Claims, 6 Drawing Sheets

(56) References Cited

U.S. PATENT DOCUMENTS 11,027,258 B2    6/2021   Pietron et al.

OTHER PUBLICATIONS

Pitman et al., Nanoscale Adv. 2020, 2, 4547-4556.
Rolison et al., ACS Appl. Mater. Interfaces 2020, 12, 41277-41287.
Novak et al., Chem. Mater. 2022, 34, 5644-5653.
Bali et al., Ing. Eng. Chem. Res. 2010, 49, 1652-1657.
Marras et al., ChemPlusChem 2016, 81, 421-432.
Ang et al., ACS Catal. 2014, 4, 3237-3248.
Bang et al. Int. J. Hydrog. Energy 2012, 37, 1436-1443.
Ashok et al., ChemCatChem 10 (2018) 3927-3942.
Ang et al., J. Catal. 329, 130-143 (2015).
Ashok et al., ChemCatChem 8, 1308-1318 (2016).
Hongmanorom et al., J. Catal. 387, 47-61 (2020).
Saw et al., Catal. Sci. Technol. 6, 5336-5349 (2016).
Tojira et al., Heliyon 7, e08202 (2021).
Shu et al., Catalysts 8, 584 (2018).
Brobova et al., Catalysts 7, 310 (2017).

* cited by examiner

NICEOX AEROGELS FOR METHANE SUPPRESSION IN THE WATER-GAS SHIFT REACTION

REFERENCE TO RELATED APPLICATIONS

This application claims the benefit of U.S. Provisional Application No. 63/579,693, filed on Aug. 30, 2023. The provisional application and all other publications and patent documents referred to throughout this nonprovisional application are incorporated herein by reference.

TECHNICAL FIELD

The present disclosure is generally related to catalysts for the water-gas shift reaction.

DESCRIPTION OF THE RELATED ART

Most current routes to generate molecular hydrogen ($H_2$), such as dry/steam reforming or biomass gasification, create large amounts of carbon monoxide (CO) as a byproduct. The water-gas shift (WGS) reaction, shown below, is widely used in industrial settings to reduce the residual CO concentration (to ~1%) as well as create additional $H_2$ in the presence of water (Twigg, *Catalyst Handbook*. Manson Pub.: London, 1996).

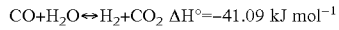

$$CO + H_2O \leftrightarrow H_2 + CO_2 \quad \Delta H° = -41.09 \text{ kJ mol}^{-1}$$

Because the reaction is moderately exothermic, the reaction is thermodynamically favored at low temperature, but the kinetics of the reaction are favored at high temperatures. Minimizing residual CO typically requires successive stages of the reaction: a high-temperature stage (310-450° C.) with Fe/Cr catalysts, and a low-temperature stage (190-250° C.) with Cu/ZnO catalysts (Pal et al. *Renew. Sustain. Energy Rev.* 93 (2018) 549-565). Although the Fe/Cr catalysts employed in the high-temperature reaction are generally regarded as durable and low cost, the presence of Cr that can contribute during fabrication or on usage to highly carcinogenic and water-soluble Cr has led to interest in alternative transition metal catalysts.

Nickel is a widely studied transition-metal catalyst for the WGS reaction, but its viability under practical conditions is limited by its tendency to form methane, $CH_4$, as well as the tendency of many Ni-based catalysts to sinter under the high temperatures required (Ashok et al. *ChemCatChem* 10 (2018) 3927-3942). Methane can be produced through hydrogenation of either CO or $CO_2$ (reactions shown below) and is considered an undesirable product because of the consumption of the desired $H_2$ product.

$$CO + 3H_2 \leftrightarrow CH_4 + H_2O \quad \Delta H° = -206.2 \text{ kJ mol}^{-1}$$

$$CO_2 + 4H_2 \leftrightarrow CH_4 + 2H_2O \quad \Delta H° = -165.1 \text{ kJ mol}^{-1}$$

While methanation over Ni-based catalysts is frequently observed experimentally, the exact methanation pathway is still not conclusively established. Sub-carbonyls are suggested intermediates in CO methanation (Ang et al. *ACS Catal.* 4 (2014) 3237-3248; Ang et al. *J. Catal.* 329 (2015) 130-143; Ashok et al. *ChemCatChem* 8 (2016) 1308-1318), whereby several molecules of CO are coordinated to a single Ni site. The adjacent CO can undergo a disproportionation reaction ($2 CO_{ads} \rightarrow CO_2(g) + C_{ads}$) followed by hydrogenating the reduced $C_{ads}$ to form $CH_4$. Ang et al. concluded that sub-carbonyls form at under-coordinated Ni step sites, and showed that doping the catalyst with Na, which disrupts sub-carbonyl formation, reduces methanation (Ang et al. *ACS Catal.* 4 (2014) 3237-3248). CO will disproportionate over discrete Ni clusters in $Al_2O_3$, but not over highly dispersed Ni sites (Galuszka et al. *J. Catal.* 68 (1981) 172-181), an insight into the importance of morphology likely applicable to the WGS reaction as well. Andersson et al. performed DFT analysis and further elucidated the role of under-coordinated Ni sites in CO methanation, identifying COH as a key intermediate species (Andersson et al. *J. Catal.* 255 (2008) 6-19).

SUMMARY OF THE INVENTION

Disclosed herein is a composition comprising an oxide-based aerogel comprising cerium and nickel (designated NiCeOx).

Also disclosed herein is a method comprising: providing a solution comprising a cerium salt and a nickel salt, forming an oxide-based gel comprising cerium, nickel, and oxygen from the solution, and converting the gel to an aerogel.

BRIEF DESCRIPTION OF DRAWINGS

A more complete appreciation will be readily obtained by reference to the following Description of the Example Embodiments and the accompanying drawings.

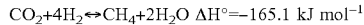

Figure 6:
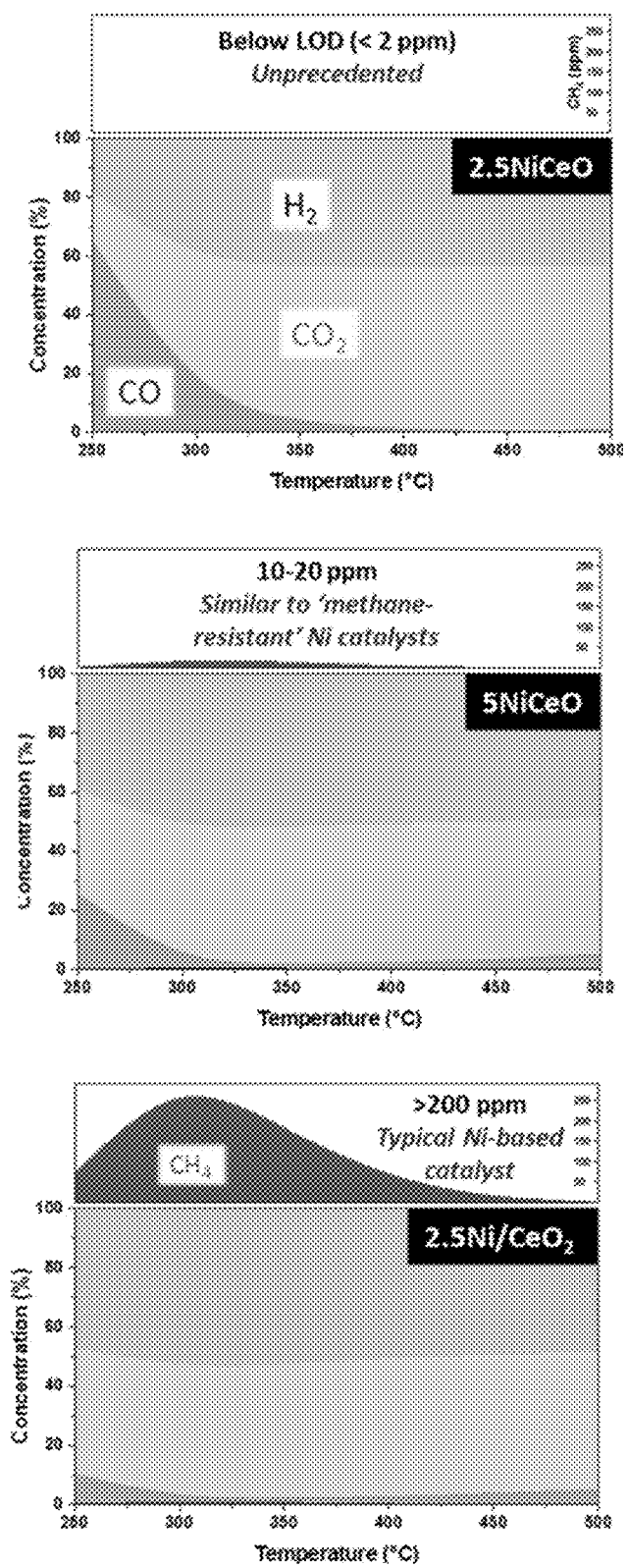

FIG. 6 shows a summary of methanation suppression as a function of Ni at. % and siting.

DETAILED DESCRIPTION

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein is a nickel-based material that effectively catalyzes the water-gas shift (WGS) reaction without producing significant methane ($CH_4$). The WGS reaction is an industrially relevant reaction that can be catalyzed over various transition metals, but Ni-based catalysts typically suffer from production of the side-product $CH_4$ in addition to the desired products ($H_2$ and $CO_2$). Disclosed herein is Ni dispersed within nanometric $CeO_2$ such that a discrete nickel phase does not form and the oxide is expressed as an aerogel. $CeO_2$ effectively activates water at interfacial sites and when expressed as an aerogel or networked ultraporous scaffold provides a high surface area, mesoporous structure. By atomically dispersing Ni at low atomic percentages within the $CeO_2$ lattice, production of $CH_4$ is reduced to trace levels during the WGS reaction. In contrast, compositions of structurally similar aerogels that form NiO clusters or when Ni(OH)$_2$ is supported on CeO$_2$-based aerogels (designated Ni/CeOx) create significant CH$_4$ during WGS reactions over the same temperature ranges.

To suppress methanation in Ni-based catalysts, Ni step sites may be reduced or entirely absent in the catalyst. In the majority of the Ni-based WGS catalysts reported in scientific literature, this degree of site isolation is impossible as any discrete Ni phases that form during operando conditions will inevitably have some step sites present. Alternatively, it is possible to atomically disperse Ni within the support material, an approach that has been reported to form highly active and stable methane dry reforming catalysts that resist coking (Akri et al. *Nat. Commun.* 10 (2019) 5181). Through the synthesis of Ni atomically dispersed in a CeO$_2$ aerogel, a catalyst that is free of Ni step sites may be made and therefore highly efficient at suppressing methane formation during the WGS reaction.

FIG. 6 shows a summary of methanation suppression as a function of Ni at. % and siting. The top graph shows that 2.5 at. % Ni-substituted CeO$_2$ aerogel (2.5NiCeO) produces CH$_4$ below the limit of detection (LOD). The middle graph shows that 5NiCeO has exceptional low-temperature activity and suppresses CH$_4$ on par with the best literature reports. The bottom graph shows that 2.5 at. % Ni supported on CeO$_2$ aerogel produces copious CH$_4$.

The aerogel may be made as described below. In general, an oxide-based gel is made from a solution comprising a cerium salt and a nickel salt. The gel is then converted to an aerogel. The amount of nickel may be, for example, from 1 at % to 15 at % relative to the cerium. The nickel atoms may be atomically dispersed, meaning that at least 50%, at least 90%, or at least 99% of the nickel atoms are not adjacent to each other. A catalyst composition may be made that includes the aerogel.

The composition may be used as a catalyst by flowing a feed gas comprising water and carbon monoxide over the composition. Under proper conditions, including temperature, the flow gas will be converted to hydrogen and carbon dioxide without producing methane. A trace amount of methane may be produced and it is still considered that methane is not produced. A reaction may convert, for example, at least 90% of the carbon monoxide in the feed gas to carbon dioxide. The reaction generally occurs on the surfaces of the aerogel, which may include surfaces facing a micropore (<2 nm in size), a mesopore (between 2 and 50 nm in size), or a macropore (>50 nm in size).

The NiCeOx aerogels described herein may provide several advantages with respect to previously described Ni-based catalysts for the WGS reaction. Highlights of the 2.5NiCeOx aerogel are summarized below.

Effective catalysis of the WGS shift reaction using Ni as the active metal
  Low operational temperature (350° C.), where ~90% of CO is converted
  No detectable CH$_4$ across the measured temperature range
  High activity without the need for a reducing pre-treatment
  Raman, XRD, and TPR evidence of atomically dispersed Ni within the CeO$_2$ aerogel, preventing formation of Ni step sites known to form the sub-carbonyl moieties implicated in methanation The following examples are given to illustrate specific applications. These specific examples are not intended to limit the scope of the disclosure in this application.

CeOx aerogels with various amounts of Ni incorporated were prepared by modifying an established method for CeOx aerogel synthesis (Pitman et al. *Nanoscale Adv.* 2 (2020) 4547-4556; Novak et al. *Chem. Mater.* 34 (2022) 5644-5653). CeCl$_3$·7H$_2$O and NiCl$_2$·xH$_2$O (x ca. 7.0-8.0) in various atomic ratios of Ni:Ce were dissolved in anhydrous methanol, followed by addition of propylene oxide. The solution was stirred 20 min and left overnight to form a sol that subsequently gels. The wet gels were rinsed with acetonitrile, then loaded into an autoclave and supercritically dried with CO$_2$. The dried aerogels were calcined in air at 500° C. for 2 h to promote crystallinity. Post-calcination, the atomic percentages (at. %) of Ni relative to Ce, measured using X ray fluorescence, were 2.69, 4.99, and 10.09 at. % Ni, values near the targeted synthetic ratios for Ni-substituted CeO$_2$. These materials are designated 2.5NiCeOx, 5NiCeOx, and 10NiCeOx, respectively.

Figure 1:
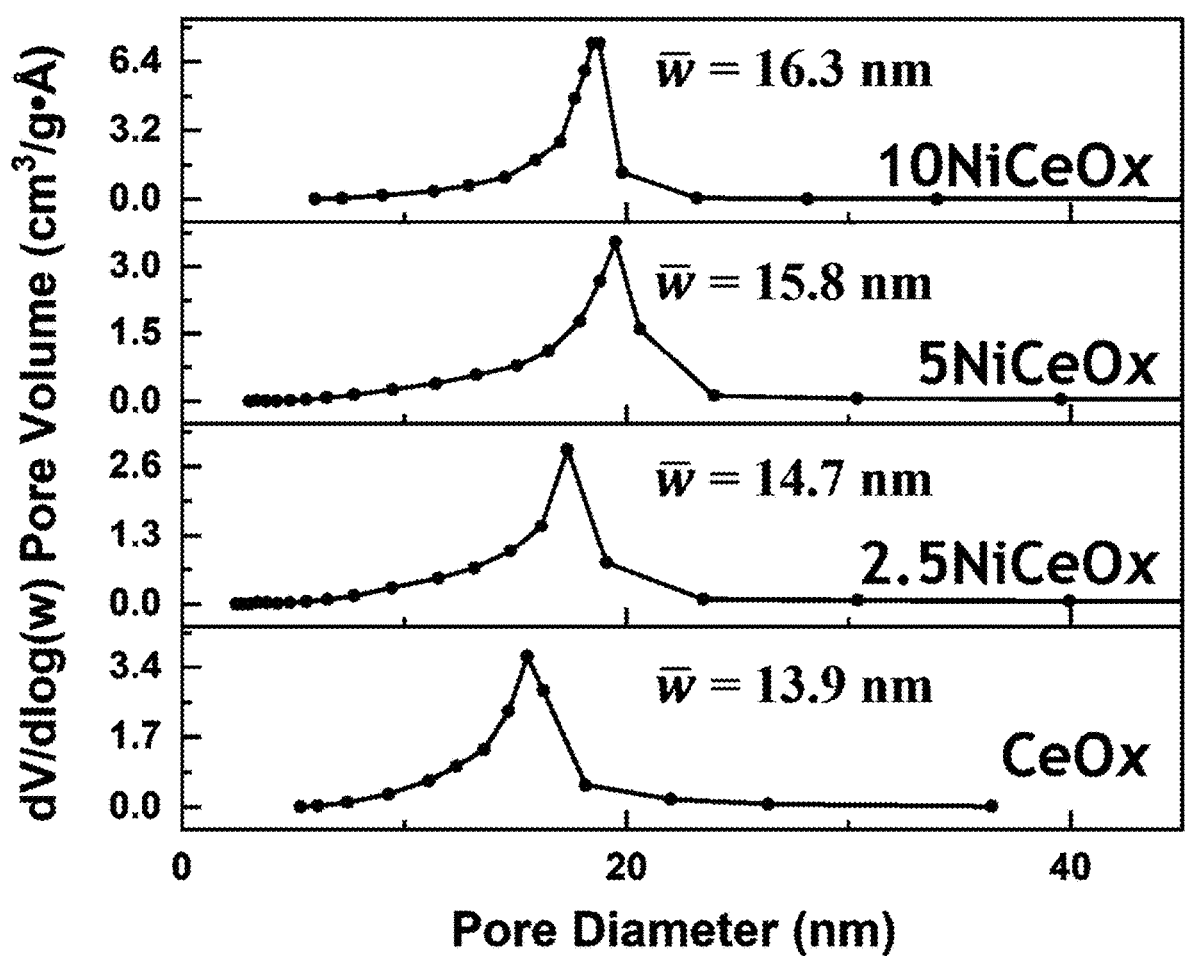
FIG. 1 shows pore size distribution plots of 2.5NiCeOx, 5NiCeOx, and 10NiCeOx.
Figure 2:
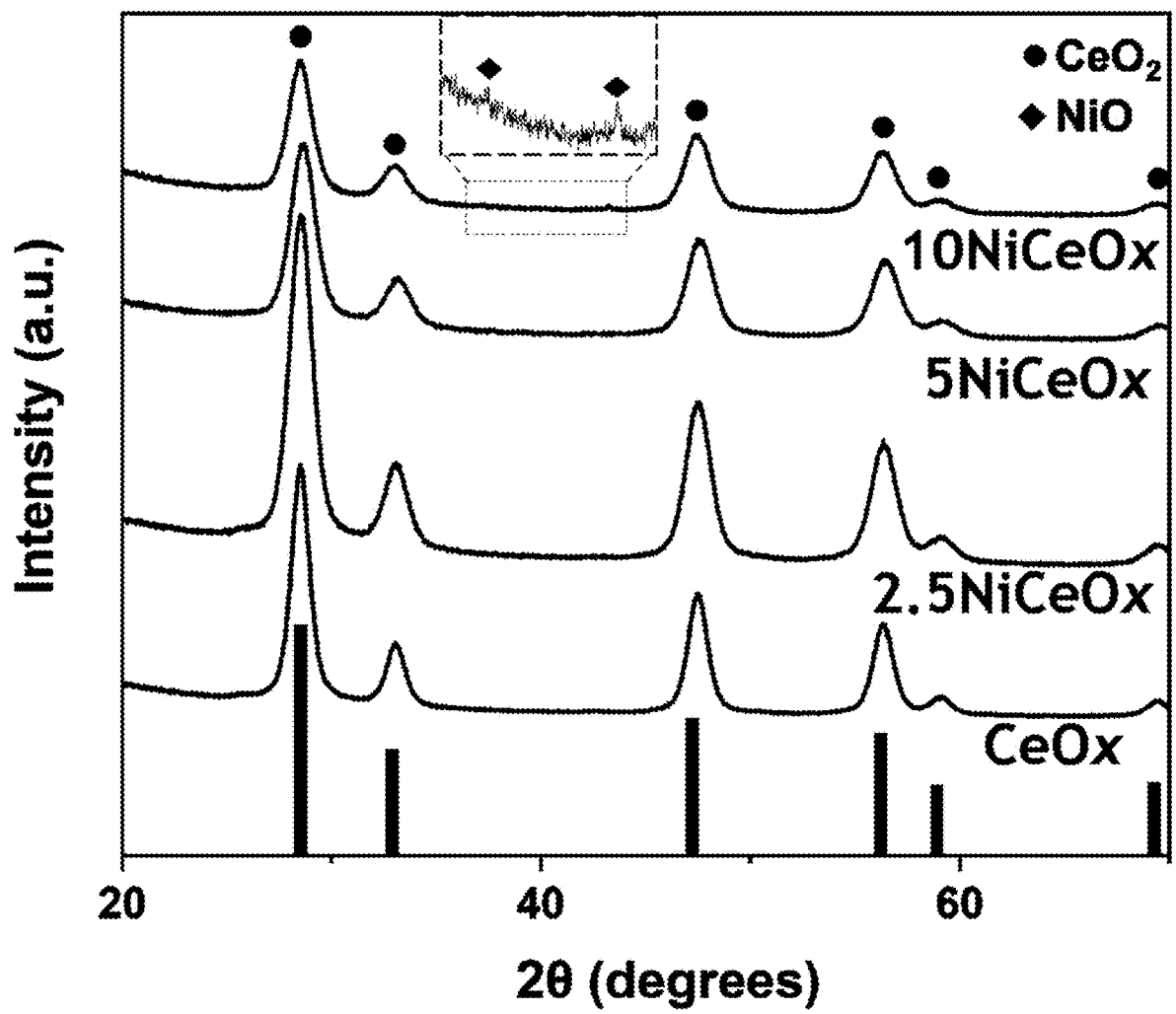
FIG. 2 shows XRD diffraction patterns of 2.5NiCeOx, 5NiCeOx, and 10NiCeOx.
Figure 3:
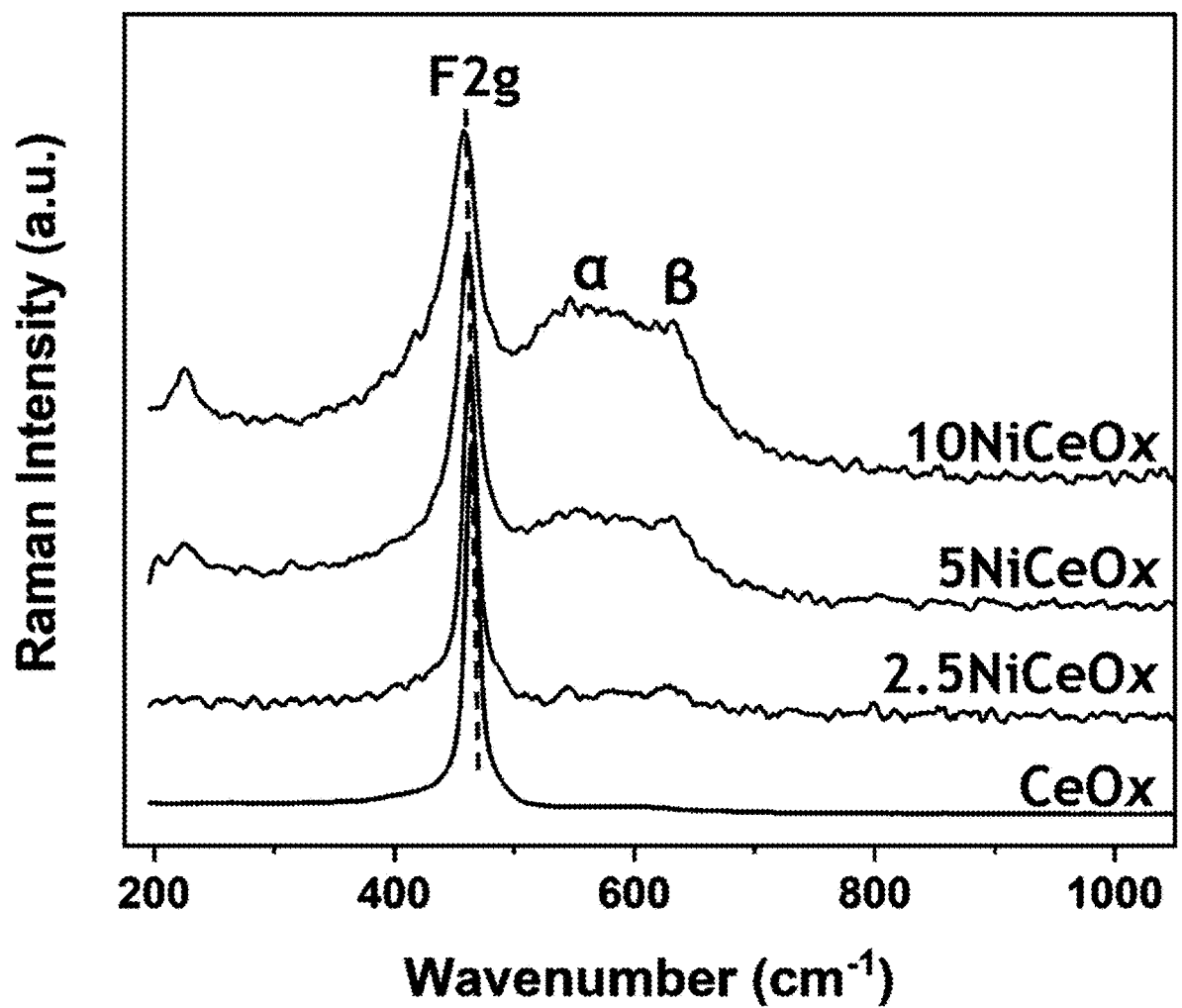
FIG. 3 shows Raman spectra of 2.5NiCeOx, 5NiCeOx, and 10NiCeOx.

FIGS. 1-3 summarize the morphology and crystallinity of the NiCeOx aerogels using X-ray diffraction (XRD), N$_2$ porosimetry, and Raman spectroscopy. The pore size distributions derived from the N$_2$ desorption isotherm (FIG. 1) show all NiCeOx samples have similar mesoporosity, with average pore width ($\overline{w}$) slightly increasing as Ni content increases. The calculated BET surface areas are 104.9, 106.6, and 109.8 m$^2$ g$^{-1}$ for 2.5NiCeOx, 5NiCeOx, and 10NiCeOx, respectively. The pore size distributions and BET surfaces areas for all NiCeOx samples are similar to previously reported native CeOx aerogels (Novak et al. *Chem. Mater.* 34 (2022) 5644-5653). Their high surface area provides an abundance of exposed facets for surface-sited catalysis.

The XRD results for all Ni-substituted ceria aerogels (FIG. 2) show strong peaks characteristic of the CeO$_2$ fluorite structure, while trace peaks of the NiO <111> and <200> planes emerge in 10NiCeOx, definitive evidence that Ni segregates into a discrete phase above 10 at. %. Although these reflections are not seen in 5NiCeOx, their absence may simply be the result of small and/or amorphous clusters of NiO. Some broadening of CeO$_2$ peaks is observed as Ni content increases, characteristic of lattice strain as Ni$^{2+}$ (low spin: 83 pm ionic radius) substitutes into Ce$^{4+}$ (101 pm ionic radius) sites.

Raman spectroscopic analysis (FIG. 3) of the NiCeOx series confirms a decrease in CeO$_2$ crystallinity from 2.5NiCeOx to 10NiCeOx with a broadening and red-shift of the F2g peak. Broad features also emerge at 550-600 nm, characteristic of oxygen vacancy-related defects in CeO$_2$ (Durgasri et al. *J. Chem. Sci.* 126 (2014) 429-435), further indicating that some Ni substitutes into Ce$^{4+}$ lattice sites. The F2g peak broadening/red-shift as well as the emergence of α and β peaks has been reported in the case of a similar transition metal (Co$^{2+}$, low spin: 79 pm ionic radius) substituting for Ce$^{4+}$ in the CeO$_2$ lattice through sol-gel synthesis; charge is balanced in the lattice through creating oxygen vacancies (Tiwari et al. *Appl. Phys. A* 124 (2018) 609).

Figure 4:
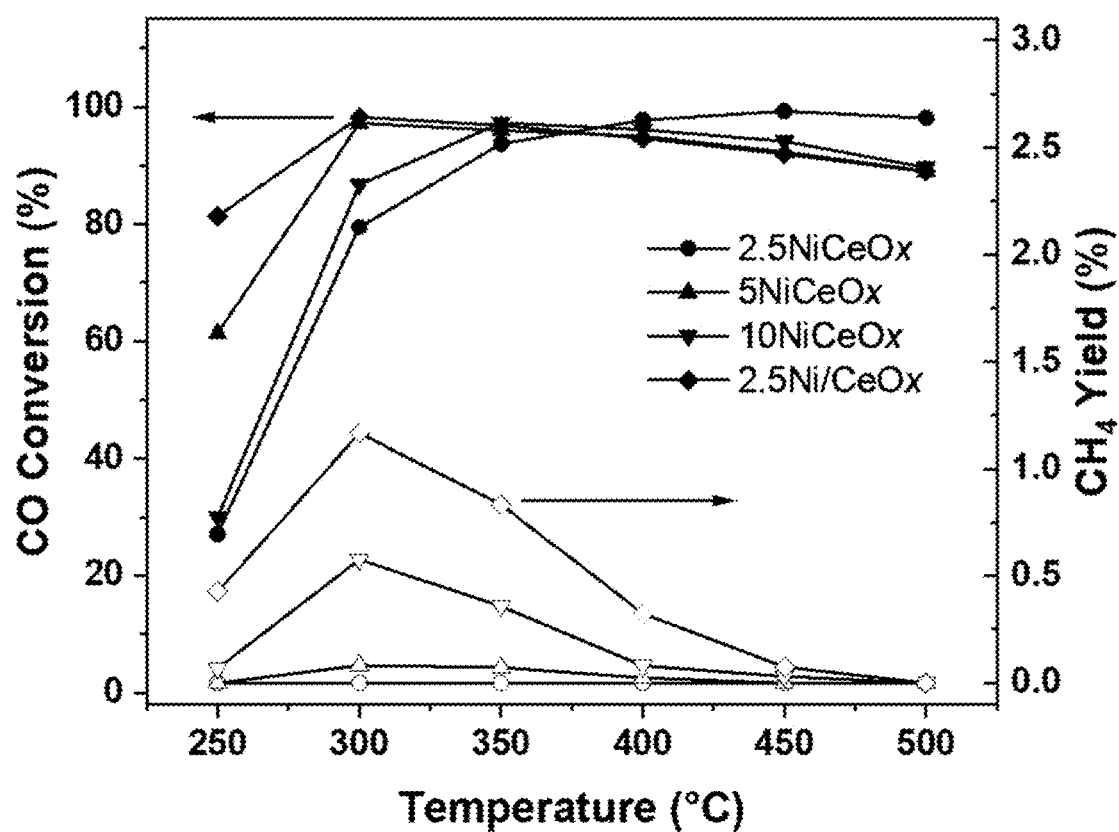
FIG. 4 shows on-stream product analysis of the water-gas shift reaction performed at 2.5NiCeOx, 5NiCeOx, 10NiCeOx, and 2.5Ni/CeOx as a function of temperature.

The WGS reaction was evaluated in a packed powder-bed reactor in a programmable ceramic tube oven, with an in-line GC-MS (Shimadzu GC-2030 ABID) used for product analysis. FIG. 4 shows analysis of the effluent after WGS reaction at 2.5NiCeOx, 5NiCeOx, 10NiCeOx and 2.5 at. % Ni photodeposited over the CeO$_x$ aerogel (2.5Ni/CeOx; prepared using an established method (Novak et al. *Chem. Mater.* 34 (2022) 5644-5653). It was previously determined that Ni in Ni/CeOx speciates as Ni(OH)$_2$ that readily converts to metallic Ni in the presence of reducing gases, likely creating an abundance of Ni step-sites (Novak et al. *Chem. Mater.* 34 (2022) 5644-5653).

As seen in FIG. 4, no detectable CH$_4$ appears over the measured temperature range for 2.5NiCeOx; under the tested conditions, the upper bound on $CH_4$ concentration is <2 ppm. At 350° C., CO conversion reaches 90%, a lower temperature than obtained using many other Ni-based WGS catalysts (Ashok et al. *ChemCatChem* 10 (2018) 3927-3942). The best results for Ni-based WGS catalysts in the literature, summarized in Table 1, do not match the combination of activity and selectivity of NiCeOx aerogels. 5NiCeOx achieves higher overall activity, converting 97.2% CO at 300° C. while still being highly selective (<0.1% $CH_4$ yield). Increased Ni content creates a more defective $CeO_2$ surface (verified by Raman spectroscopy) amenable to activating $H_2O$ as well as discrete Ni clusters that create sub-carbonyls as intermediates for $CH_4$ formation. 2.5Ni/CeOx shows the most pronounced tendency to form $CH_4$, with 1.2% yield at 300° C. In all four catalysts, CO conversion decreases slightly at 500° C.; the exothermic reaction becomes progressively more thermodynamically limited as temperature increases. The $CH_4$ concentration for 5NiCeOx, 10NiCeOx, and 2.5Ni/CeOx decreases at higher temperatures as well, which is commonly observed in WGS catalysts.

TABLE 1

WGS results for NiCeOx aerogels in comparison to other notable Ni-based catalysts

| Material | WHSV (mL $g^{-1}h^{-1}$) | CO Conversion (% at 300° C.) | Max $CH_4$ Yield (%) [@ Temp.] | Reference |
|---|---|---|---|---|
| 2.5NiCeOx | 60,000 | 79.5 | <0.02 | current |
| 5NiCeOx | | 97.2 | 0.09 [300° C.] | results |
| 10NiCeOx | | 86.8 | 0.58 [300° C.] | |
| 2.5Ni/CeOx | | 98.2 | 1.2 [300° C.] | |
| Ni/2Na/$CeO_2$ | 60,000 | 20 | 0.26 [400° C.] | (1) |
| Ni/5K/$CeO_2$ | 60,000 | 33 | 0.30 [400° C.] | (2) |
| Ni/$SiO_{2P}$[600] | 60,000 | 44 | 0.28 [350° C.] | (3) |
| Ni/Zr—Ce-SBA-15 | 60,000 | 26 | 0.80 [350° C.] | (4) |
| 5Ni5Cu/$CeO_2$ | 60,000 | * | 0.30 [350° C.] | (5) |
| 1Re/5Ni/GDC | 40,000 | 85 | * | (6) |
| AuNiCe | 84,000 | 55 | * | (7) |
| 12.5% Ni/$CeO_2$ | 100,000 | 88 | 3.7 [300° C.] | (8) |

(* = not explicitly reported).:
WHSV = Weight hourly space velocity

1. M. L. Ang, U. Oemar, E. T. Saw, L. Mo, Y. Kathiraser, B. H. Chia, S. Kawi, Highly active Ni/xNa/$CeO_2$ catalyst for the water-gas shift reaction: Effect of sodium on methane suppression. *ACS Catal.* 4, 3237-3248 (2014).
2. M. L. Ang, U. Oemar, Y. Kathiraser, E. T. Saw, C. H. K. Lew, Y. Du, A. Borgna, S. Kawi, High-temperature water-gas shift reaction over Ni/xK/$CeO_2$ catalysts: Suppression of methanation via formation of bridging carbonyls. *J. Catal.* 329, 130-143 (2015).
3. J. Ashok, M. L. Ang, P. Z. L. Terence, S. Kawi, Promotion of the water-gas-shift reaction by nickel hydroxyl species in partially reduced nickel-containing phyllosilicate catalysts. *ChemCatChem* 8, 1308-1318 (2016).
4. P. Hongmanorom, J. Ashok, S. Das, N. Dewangan, Z. Bian, G. Mitchell, S. Xi, A. Borgna, S. Kawi, Zr—Ce-incorporated Ni/SBA-15 catalyst for high-temperature water gas shift reaction: Methane suppression by incorporated Zr and Ce. *J. Catal.* 387, 47-61 (2020).
5. E. T. Saw, U. Oemar, M. L. Ang, H. Kus, S. Kawi, High-temperature water gas shift reaction on Ni—Cu/$CeO_2$ catalysts: effect of ceria nanocrystal size on carboxylate formation. *Catal. Sci. Technol.* 6, 5336-5349 (2016).
6. O. Tojira, J. G. Lomonaco, T. Sesuk, S. Charojrochkul, P. Tepamatr, Enhancement of hydrogen production using Ni catalysts supported by Gd-doped ceria. *Heliyon* 7, e08202 (2021).
7. M. Shu, S. Wei, C.-J. Jia, D.-L. Wang, R. Si, Effect of nickel oxide doping to ceria-supported gold catalyst for CO oxidation and water-gas shift reactions. *Catalysts* 8, 584 (2018).
8. L. Brobova, D. Andreev, E. Ivanov, N. Mezentseva, M. Simonov, L. Makarshin, A. Gribovskii, V. Sadykov, Water-gas shift reaction over Ni/$CeO_2$ catalysts. *Catalysts* 7, 310 (2017).

Overall, these experimental results align with the mechanistic understanding of methanation over Ni-based WGS catalysts, namely, Ni step-sites create sub-carbonyls that disproportionate CO, leaving isolated C to react with $H_2$ and eventually form $CH_4$. The atomic dispersion of Ni in 2.5NiCeOx creates an absence of these step-sites, resulting in a complete lack of $CH_4$ being produced despite the high activity of this expression of Ni+Ce for the WGS reaction.

Figure 5:
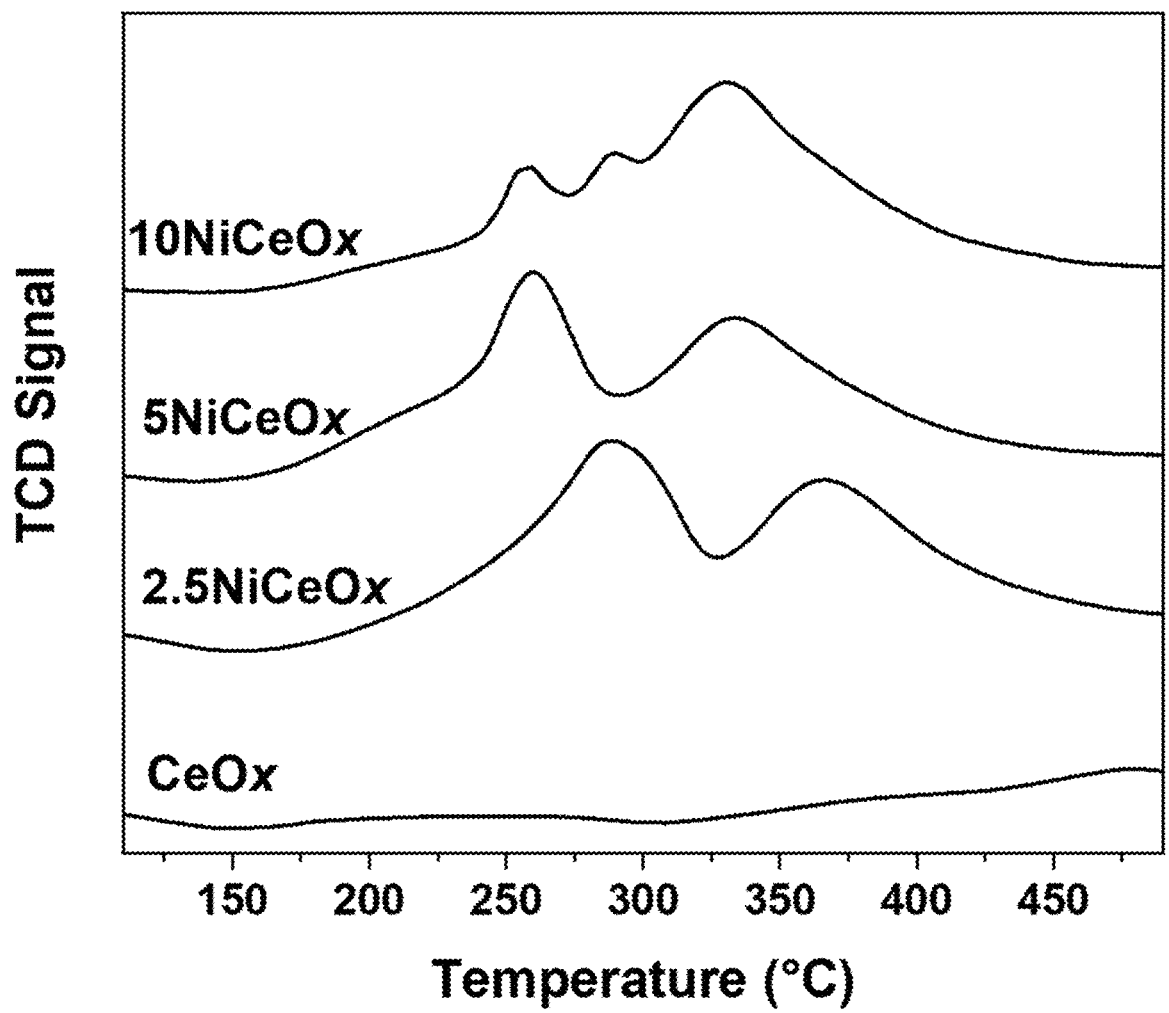
FIG. 5 shows TPR profiles of 2.5, 5, and 10NiCeOx in comparison to Ni-free $CeO_2$.

$H_2$ temperature-programmed reduction ($H_2$-TPR) was performed to gain further insights into the catalytic properties of the 2.5, 5, and 10NiCeOx aerogels. As shown in FIG. 5, the CeOx aerogel shows no clear TPR signals, thus indicating that $CeO_2$ is not reduced by $H_2$ over this temperature range. Therefore, any peaks observed over this temperature range for NiCeOx samples are attributable to reduction of incorporated nickel.

The TPR spectrum for 2.5NiCeOx exhibits two clear peaks at 288 and 368° C., a profile similar to other dispersions of Ni within an oxide support (Jantarang et al. *Prog. Nat. Sci.: Mater. Int.* 28 (2018) 168-177). For 5NiCeOx these peaks shift to lower temperatures (260 and 334° C.) suggesting that as the Ni becomes less coordinated within the oxide, its surface becomes more easily reduced (Jehng et al. *Catal. Lett.* 77 (2001) 147-154). 10NiCeOx also displays this shift to a lower reduction temperature along with the emergence of another peak likely attributable to a discrete Ni phase, confirming the XRD indications of discrete NiO. The reducibility of 5NiCeOx and 10NiCeOx by $H_2$ is consistent with increased methane formation during WGS reaction (FIG. 4) due to the presence of some methanation-prone Ni step sites.

Many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A composition comprising:
   an oxide-based aerogel comprising cerium and nickel;
   wherein the nickel atoms are atomically dispersed in the aerogel.

2. The composition of claim 1, wherein the at % of nickel relative to cerium is from 1 at % to 15 at %.

3. The composition of claim 1, wherein at least 50% of the nickel atoms are not adjacent to each other.

4. The composition of claim 1, wherein at least 90% of the nickel atoms are not adjacent to each other.

5. A method comprising:
   providing the composition of claim 1;
   flowing a feed gas comprising water and carbon monoxide over the composition; and
   performing a water-gas shift reaction.

6. The method of claim 5, wherein the water-gas shift reaction does not produce methane.

7. The method of claim 5, wherein the water-gas shift reaction converts at least 90% of the carbon monoxide to carbon dioxide.

8. A method comprising:
   providing a solution comprising a cerium salt and a nickel salt;
   forming an oxide-based gel comprising cerium, nickel, and oxygen from the solution; and
   converting the gel to an aerogel;
   wherein the nickel atoms are atomically dispersed in the aerogel.

9. The method of claim 8, wherein the at % of nickel relative to cerium in the aerogel is from 1 at % to 15 at %.

10. The method of claim 8, wherein at least 50% of the nickel atoms are not adjacent to each other.

11. The method of claim 8, wherein at least 90% of the nickel atoms are not adjacent to each other.

* * * * *

UNITED STATES PATENT AND TRADEMARK OFFICE
CERTIFICATE OF CORRECTION

| | | |
|---|---|---|
| PATENT NO. | : 12,337,302 B2 | Page 1 of 1 |
| APPLICATION NO. | : 18/820823 | |
| DATED | : June 24, 2025 | |
| INVENTOR(S) | : Travis G. Novak et al. | |

It is certified that error appears in the above-identified patent and that said Letters Patent is hereby corrected as shown below:

On the Title Page

Item (72) should read:
Travis G. Novak, Lorton, VA (US);
Matthew R. Buck, Columbia, MD (US);
Paul A. SeSario, Alexandria, VA (US);
Debra R. Rolison, Arlington, VA (US);
Austin E. Herzog, Washington, DC (US)

Signed and Sealed this
Fourth Day of November, 2025

John A. Squires
*Director of the United States Patent and Trademark Office*